No. 886,019. PATENTED APR. 28, 1908.
D. C. SMITH & W. F. GORTON.
RIM FOR MOTOR CAR WHEELS.
APPLICATION FILED OCT. 10, 1906.
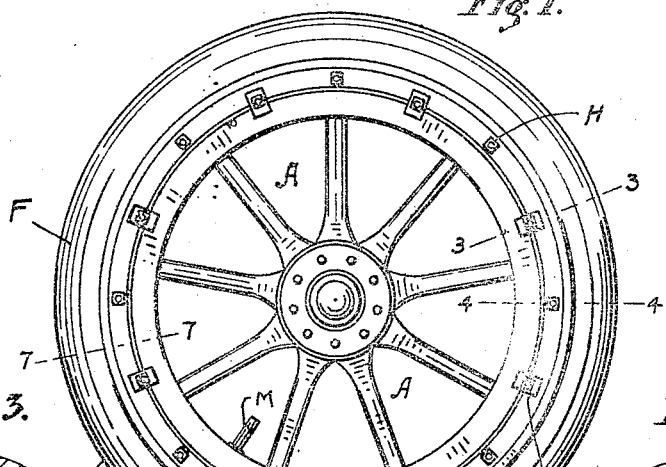
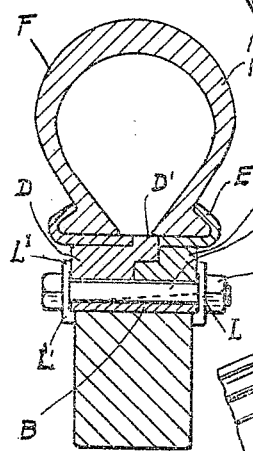
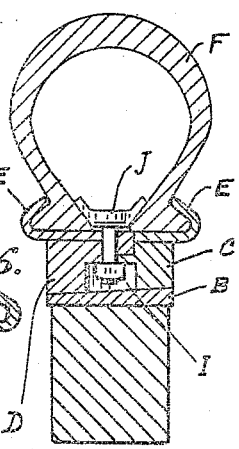
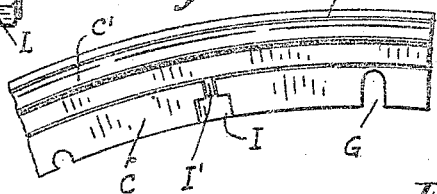
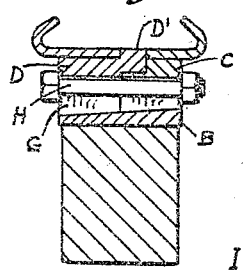
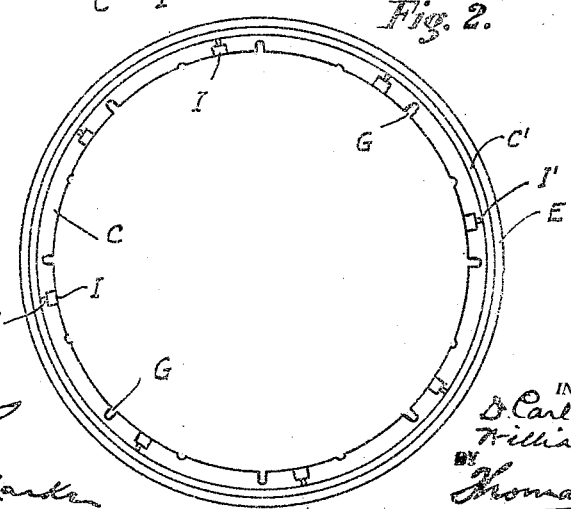

UNITED STATES PATENT OFFICE.

DON CARL SMITH AND WILLIAM F. GORTON, OF MUNCIE, INDIANA.

RIM FOR MOTOR-CAR WHEELS.

No. 886,019.   Specification of Letters Patent.   Patented April 28, 1908.

Application filed October 10, 1906. Serial No. 338,214.

*To all whom it may concern:*

Be it known that we, DON CARL SMITH and WILLIAM F. GORTON, citizens of the United States, residing at Muncie, in the county of Delaware and State of Indiana, have invented a new and useful Rim for Motor-Car Wheels, of which the following is a specification.

Our invention relates to improvements in tires for vehicle wheels and has especial reference to devices for detachably fastening to motor-car wheels the flexible tires therefor.

While our invention will be shown herein as especially applicable to pneumatic tires, it will be understood that our device will be of equal utility where the solid or cushion tire is used.

Many devices and divers forms of construction of varying degrees of effectiveness are now in use whereby the flexible tire is detachably secured to the rim especially adapted therefor, the rim in turn being rigidly secured to the felly. By the means now in use the attachment of the tire to and the detachment from the rim is accomplished with more or less facility depending upon the construction and adaptation of the rim, there being some wherein the rim is provided with detachable edges retained apart and strained toward each other so as to retain the clencher form of tire, and others with angular or flaring detachable edges adapted to hold the ordinary tire base or shoe in true transverse position, the tire itself depending for its hold upon the rim, upon an endless cable embedded therein, or upon other independent holding means. Various devices for drawing down and for forcing together and securing these detachable edges or rings have been devised, such as turn-buckles, floating rings, bands, and special tools. The difficulty remains however that notwithstanding all of these devices so used, a tire cannot be attached to the wheel provided with such rims and contrivances, without the necessity of the manipulation by a mechanic or at least a person of more than ordinary skill and ingenuity, of unwieldy bands, rings, and tightening devices, and special tools for prying and forcing the tire. Moreover the tire must be in deflated condition when attached to or detached from the wheel and the prying and forcing of it by the devices and tools necessary and incident to its manipulation are injurious, not only to the tire, but to the rim, and much valuable time is frequently required in the work of detaching a disabled tire from and the replacing on the wheel of a new one.

The purposes of our invention are to overcome these faults and it accordingly has for its object to provide means whereby the pneumatic tire may be maintained at all times inflated and available for immediate use, and may be by a person of ordinary skill easily and speedily attached to and as easily and quickly detached from the wheel.

Another object of our invention is to afford facility whereby the tire may be completely and more speedily and easily attached to and removed from the rim than is possible by present means in use, and without injury or damage to the tire.

A still further object is to provide a rim of this character which will be of great durability, of few parts and simple form and economical of manufacture.

The principal feature of our invention resides in the rim having the flanges formed integral therewith, being divided centrally and having its members detachably secured to each other for retaining or releasing the tire as may be desired, and such rim, with the tire locked therein, being adapted to be detachably secured to the wheel.

The objects thus set forth and other objects which will become apparent as the specification of our invention is disclosed, are accomplished by the device and construction described and illustrated in the accompanying specification and drawings, and defined in the subjoined claims.

Similar letters and numerals of reference refer to similar parts throughout the several views, in which—

Figure 1 is a side view of a wheel fitted with our improved rim complete; Fig. 2 a side view of the right-half section of the tire-rim; Fig. 3 a transverse sectional view taken on the line 3—3 Fig. 1; and Fig. 4 is a transverse sectional view taken on the line 4—4 Fig. 1 the tire having been removed. Fig. 5 shows an enlarged view of a portion of the right-half section of the tire-rim, and Fig. 6 is a transverse sectional view thereof. Fig. 7 is a transverse sectional view taken on the line 7—7 Fig. 1.

A designates an ordinary substantially constructed wooden wheel having the rigidly secured felly-rim B machined true throughout the extent of its face and slightly beveled for the purpose hereinafter shown. The tire-rim is composed of two annularly formed members machined and finished so that the inner faces thereof will fit correctly each to the other. C designates the right-half section, and D the left-half section, the former being provided with the rabbet C¹ and the latter with the shoulder D¹ whereby a close and substantial jointure of the two sections is obtained. The seat of the rabbet and bottom of the shoulder are correspondingly beveled whereby the placing together and taking apart of the members is rendered easy. It will be readily seen that by making the rim thus separable the difficulty and fault in rims as now made where divers contrivances are employed at the edges thereof so that the tire may be slipped off without stretching or forcing, is at once overcome. The members C and D are provided with the in-turned flanges E and are transversely beveled on their bottom faces so as to register, sufficient clearance being provided, with the beveled face of the felly-rim B. The clencher type of tire being used in the disclosure herein of our invention, we have necessarily shown the flanges E as being in-turned; for the accommodation of tires of a type other than the clencher, these edges or flanges may be angular or flaring the functions thereof being merely to prevent the tire from escaping from the rim.

In the construction of our tire-rim, we have employed the use of the plain rim section now generally manufactured, by cutting away longitudinally a central portion thereof and securing the two sections thus formed, to the members C and D, by countersunk riveting. We find this to be a very satisfactory form of construction of our tire-rim, however we do not desire to thus limit ourselves as it is obvious that the members composing the tire-rim might be made each of a single piece and the flaring or angular flange used to suit the style of tire for which it is intended. The shoulder D¹ besides being so provided and as of such form as to afford ease in making a true jointure of the sections C and D is of such extent transversely as to bring the interior line of jointure of the sections well away from the center, thereby preventing the possibility, when the sections are secured together of pinching or mutilating the inner-tube, and making possible the insertion, in proper position with reference to the lugs, of the inner-tube, which will reside in the flexible case F. This is an important feature of our invention, as, by reason of the prying, stretching wrenching and manipulation of the case necessary in securing it to rims as at present devised, the plain view of the inner-tube being obstructed, it is often wedged out of true position, notwithstanding the most careful manipulation of the same, in such obscured position, by the hand of the manipulator.

G designates suitable transverse grooves provided in the sections C and D at intervals so as to correctly register each with the other, the function whereof is to facilitate the insertion of the bolts H whereby the tire-rim sections are held together; the edges immediately about the arch of these grooves are slightly countersunk so that in tightening the bolts, they will readily be locked as the same are tightened, into their correct position in the arch of the groove. While we have shown the groove and bolt as the method for securing these sections together we do not desire to be thus limited, as other means whereby these sections may be easily secured together and as easily separated could be employed without departing in the least from the nature or principle of our invention.

Provided at suitable locations in the tire-rim are the radially disposed holes enlarged into the aperture I; in these holes reside the shanks of the lugs J the function of which lugs is to grip and retain in position the lips of the flexible tire or case. The holes are rectangular to accommodate the flat sides of the shank whereby the lug is prevented from rotating. The description of this lug is merely incidental in that we have shown our invention as applicable to the use of the clencher form of tire, and we lay no claim to this detail. However it will be observed that the shoulder D¹ in addition to the functions performed by it as heretofore set forth, performs the additional function of affording means for the retaining loosely and independently in their proper positions, these lugs, preparatory to their being tightened into operative position. This feature is of great utility and will be hereinafter referred to. Below the lower edge of the shoulder D¹ the holes for these shanks are formed by the semicircular recess I¹ enlarged into the aperture I which forms a suitable space for the manipulation of the tightening nut of the shank.

Besides the advantage obtained in our invention, of rendering unnecessary the shank of length sufficient to extend completely through the felly, as is necessary in wheels as at present fitted for clencher tires, we afford herein a closed aperture thereby preventing the entry into the case of foreign substances such as dust and dirt.

At the place where it is necessary for the valve stem through which the air is supplied to the inner-tube, to protrude, a radially disposed hole therefor is simply bored through the felly-rim and felly.

From this description of the construction of our improved rim the mode of manipulation and use will be readily apparent. The bead of the case F is first laid into the flange E, the lugs are then introduced into the holes provided in the shoulder D¹ and there loosely retained; the member C is then placed in position the shoulder D¹ readily coming to rest in the rabbet C¹, the grooves G and apertures I coming into true registration, and the opposite flange of the rim engaging the other bead of the case. The inner-tube will not have been disturbed in the least by this operation of fitting the case to the rim. The bolts H are then quickly and easily slipped into the grooves G and the nuts then tightened bringing the members of the tire-rim into snug contact. The operation of securing the tire immovably thereto is then easily completed by the tightening of the lugs. It will be obvious that where the flanges of the rim are of a shape differing from the shape herein shown as applicable to the clencher type of tire, to accommodate a form of tire other than the clencher, the lugs will be dispensed with. This however in no way affecting the operation, application or use of our invention to tires of form other than the clencher type. The tire being thus secured in the rim, may be then inflated and so maintained in readiness for the application at any time to the wheel. M designates the flexible air-valve tube adapted to pass through suitable opening provided therefor in the tire-rim, felly-rim and felly.

At proper intervals about the felly-rim upon its face and at the line of juncture of the tire-rim therewith, are provided suitable transversely extending holes disposed at a right angle thereto which, as plainly shown in Fig. 3, form semicircular channels across the elevated side of the felly-rim. Adapted to pass through these holes are the bolts K provided with the clips L having the bent ends L¹ as shown in Fig. 3.

In applying the tire-rim to the wheel it is simply slipped onto the beveled felly-rim, as shown in Fig. 3, the same coming to rest in correct position on the felly-rim both transversely and otherwise. The bolts K with the clips L next their head-ends are then inserted, the clip is applied then at the opposite side, and as the nuts K¹ are tightened the tire-rim will be drawn into rigid and secure contact with the felly-rim and wheel and there retained. The bolts K thus become embedded in the contacting surfaces of these rims and afford a jointure of great solidity. The function of the clips L is simply to afford bearings for the heads and nuts of the bolts K, and the bent ends of the clips indent the surfaces against which they rest sufficiently so they are prevented from slipping.

Our device is of especial utility for use and application to the wheels of motor-cars or automobiles, and especially those of the greatest weight and intended for the longest runs and highest speed. One of the most frequent sources of breakage and loss of time in the performance of this class of vehicles, is the lack of means and facility whereby, when a tire is damaged or punctured or from any cause rendered ineffective, the injury or difficulty may be quickly and effectively remedied. Even if an additional tire is carried by the machine, as is now generally the case in long runs or speed trials, yet the difficulty arising from a disabled tire is only partially remedied since the disabled tire has to be detached from the rim by prying and forcing and the manipulation of rings, flanges and contrivances, and the new tire in deflated condition has to be applied to the wheel in like manner in which operation a great deal of time is necessarily consumed, and the case and inner tube is always more or less strained, mutilated and damaged, and moreover the same has then to be inflated.

In addition to the ease and facility afforded in our device for securing on and taking the tire from the wheel, we accomplish in addition to these advantages, a tire which may be kept and retained when not actually in action, in an inflated condition in readiness for immediate use, hence, in case of failure of a tire in use in the machine, the extra tire carried ready-inflated, may be immediately available. The utility of our invention in this reference will be especially appreciated, when it is realized that the passing of time has to be seriously reckoned with in touring and speed performances of the motor-car or automobile. To make the change, the bolts K are removed, the tire-rim is easily pushed free from the felly-rim either by the hand of the manipulator or by a few taps of a hammer or other suitable instrument, and the "extra" tire fitted with our improved rim is quickly and easily slipped into position on the felly-rim in the place of its predecessor, the bolts K are then replaced and tightened and the machine is in readiness to proceed on a sound and inflated tire. If it is desired to mend or repair the disabled tire just removed, the lugs J are first loosened, then the bolts H are loosened and easily by hand moved free from the slots G; the member C is then easily lifted from the opposite member and from the case; the inner-tube may then be easily removed, as may also be the case.

The replacing of the tire complete in the rim is simply a repetition of the operation heretofore described. The repaired tire may be then inflated and retained and carried as an "extra" in its inflated and tested and dependable condition in readiness to be applied in the same manner as just described.

What we claim as our invention, and desire to secure by Letters Patent of the United States, is—

1. The combination with a wheel having a rigidly secured felly rim thereon, of a tire-retaining rim comprising oppositely disposed annular rings having in-turned flanges at their outer edges, their vertical facing edges being provided with a rabbeted joint having the seat thereof beveled, the vertical line of jointure of the facing edges of the rings being to one side of a line central between the flanges, there being transverse apertures provided in the rings and having bolts therein whereby the members may be secured together, the inner surface of the tire-retaining rim being machined to fit the felly rim, and transverse apertures being provided at intervals at the line of jointure of the tire-retaining rim and the felly rim and having bolts therein whereby the tire-retaining rim, in assembled form, may be secured to the wheel, substantially as described.

2. The combination with a wheel having a rigidly secured felly-rim thereon beveled and provided with a series of transverse grooves therein, of a tire-retaining rim composed of a pair of oppositely disposed annular rings, their inner sides being transversely grooved to receive bolts for securing the sections together, their vertical facing edges provided with a rabbet joint having the seat thereof beveled and the inner surface of said tire-rim being beveled so as to register throughout with the beveled face of the felly-rim and having transverse grooves at suitable intervals to register with the corresponding grooves in the felly-rim for the reception of bolts for securing the tire-retaining rim to the wheel.

3. The combination with a wheel having a rigidly secured felly-rim thereon beveled and provided with a series of transverse grooves therein, of a tire-retaining rim composed of a pair of oppositely disposed annular rings, their inner sides being transversely grooved to receive bolts for securing the sections together, their vertical facing edges being provided with a rabbet joint having its seat beveled, the ledge being provided with radially disposed holes at proper intervals opening into semicircular recesses provided correspondingly in the faces of said sections and the inner surface of the said tire-rim being beveled so as to register throughout with the beveled face of the felly-rim having transverse grooves at suitable intervals to register with the corresponding grooves in the felly-rim for the reception of bolts for securing the tire-rim to the wheel.

In testimony whereof we have hereunto signed our names to this specification in the presence of two subscribing witnesses.

D. CARL SMITH.
WILLIAM F. GORTON.

Witnesses:
LEO. S. GANTER,
EDWARD G. CLARKE.